United States Patent [19]
Godlew

[11] Patent Number: 6,083,134
[45] Date of Patent: Jul. 4, 2000

[54] ELECTRONICALLY ACTUATED LOCKING DIFFERENTIAL

[75] Inventor: David P. Godlew, Beverly Hills, Mich.

[73] Assignee: Eaton Corporation, Cleveland, Ohio

[21] Appl. No.: 09/252,344

[22] Filed: Feb. 18, 1999

[51] Int. Cl.[7] .................................................. F16H 48/30
[52] U.S. Cl. ........................ 475/231; 475/150; 475/233; 475/241
[58] Field of Search ................................... 475/149, 153, 475/230, 231, 233, 234, 236, 150, 241, 243, 246, 237

[56] References Cited

U.S. PATENT DOCUMENTS

| Re. 28,004 | 5/1974 | Otteman | 74/711 |
|---|---|---|---|
| 3,369,428 | 2/1968 | Hughson | 74/710.5 |
| 3,453,905 | 7/1969 | Schmid | 74/710.5 |
| 5,019,021 | 5/1991 | Janson | 475/150 |
| 5,092,825 | 3/1992 | Goscenski, Jr. et al. | 475/150 |
| 5,273,499 | 12/1993 | Friedl et al. | 475/241 |
| 5,845,546 | 12/1998 | Knowles et al. | 74/650 |
| 5,911,291 | 6/1999 | Suetake et al. | 192/35 |
| 5,911,643 | 6/1999 | Godlew et al. | 475/150 |

*Primary Examiner*—Khoi Q. Ta
*Attorney, Agent, or Firm*—L. J. Kasper

[57] ABSTRACT

A locking differential gear mechanism of the type which can operate in either a manual mode or an automatic mode. The mechanism includes a gear case (11), and differential gearing including a side gear (23). The side gear (23) includes a flange portion (43) having a set of gear teeth (45), and adjacent thereto is a locking member (47), also having a set of gear teeth (49), disposed to engage the gear teeth on the flange portion. A ball ramp actuator is disposed adjacent the locking member (47), which is preferably integral with an inner actuating plate (57). There is an outer actuating plate (59), preferably disposed outside the gear case (11), and a set of cam balls (73) operable with the actuating plates (57,59) to cause ramp-up, and engagement of the gear teeth (45,49). An electromagnetic coil assembly (75) is disposed adjacent the ball ramp actuator, and is operable to retard rotation of the outer actuating plate (59), and initiate ramp-up, in response to an electrical input signal. The resulting locking differential is very compact and can be engaged or disengaged very quickly.

11 Claims, 5 Drawing Sheets

ELECTRONICALLY ACTUATED LOCKING DIFFERENTIAL

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a traction modifying differential, and more particularly, to such a differential of the type in which the differential gearing may be locked in response to an electrical input signal.

Traction modifying differentials of the type to which the present invention relates typically include a gear case defining a gear chamber, and disposed therein, a differential gear set including at least one input pinion gear, and a pair of output side gears. A clutch pack is typically disposed between at least one of the side gears and an adjacent surface of the gear case, such that the clutch pack is operable to limit relative rotation between the gear case and the one side gear. In most differentials of the type described, engaging the clutch pack is achieved by one of several different approaches.

In one approach, a "locking differential" of the type illustrated and described in U.S. Pat. No. Re 28,004, assigned to the assignee of the present invention and incorporated herein by reference, the clutch pack is normally disengaged. When one of the wheels begins to spin out, relative to the other wheel, a speed sensitive mechanism senses the speed differential and, by means of a ramping mechanism, locks the clutch pack solid. Thereafter, both outputs of the differential rotate at the same speed.

U.S. Pat. No. 5,019,021, also assigned to the assignee of the present invention and incorporated herein by reference, illustrates another approach, a "limited slip differential" in which the loading on the clutch pack may be varied in response to an external electrical input signal, thus varying the amount of slip within the clutch pack, and therefore, the amount of bias torque transmitted from one side gear to another. As is well known to those skilled in the art, in a limited slip differential, there is typically a certain amount of "slip", or speed differential, between the two side gears whenever the vehicle encounters less than optimum traction conditions.

Although the performance of limited slip and locking differentials of the type shown in the above-incorporated patents is, in general, quite satisfactory, there are certain disadvantages of the particular design, for certain vehicle applications. The requirement for at least one, and typically two clutch packs, adds substantially to the overall cost of the differential, especially when the individual clutch disks are provided with a relatively more sophisticated friction material, able to withstand elevated temperatures under continuous slipping conditions.

In addition, there are many vehicle applications in which it would be desirable to provide a traction modifying differential, to replace an existing open differential, but wherein the traction modifying differential would have to fit within the same space currently occupied by the open differential, in order to avoid a complete redesign of the surrounding structure. In such a situation, the addition of one or two clutch packs, within an existing differential case, would be impossible without redesigning the pinion gears and side gears and downsizing them, which is typically not feasible.

BRIEF SUMMARY OF THE INVENTION

Accordingly, it is an object of the present invention to provide an improved locking differential of the type which does not require expensive and space-consuming sets of friction disks.

It is a more specific object of the present invention to provide such an improved locking differential which may be actuated in response to an external electrical input signal, and which may be either engaged or disengaged very quickly.

It is a related object of the present invention to provide an improved locking differential which accomplishes the above-stated objects, and in which the actuation mechanism is sufficiently compact to require minimum redesign of the surrounding structure.

The above and other objects of the invention are accomplished by the provision of a differential gear mechanism of the type including a gear case defining an axis of rotation and a gear chamber. Differential gear means is disposed in the gear chamber and includes at least one input gear and first and second output gears. The mechanism includes means operable to limit rotation of the first output gear, relative to the gear case for common rotation therewith. The mechanism includes actuating means for the rotation limiting means, the actuating means including first and second actuating plates comprising a cam and ramp type actuator, wherein relative rotation of the first and second actuating plates from an unactuated condition to an actuated condition is effective to move the rotation limiting means toward an engaged condition. The second actuating plate is disposed, in the unactuated condition, to rotate with the gear case. An electromagnetic actuator is disposed adjacent the second actuating plate and includes friction means operable in response to an electrical input signal to move to an actuated position in frictional engagement with the second actuating plate, effective to cause relative rotation of the actuating plates to the actuated condition.

The improved differential gear mechanism is characterized by the rotation limiting means comprising a locking member disposed adjacent the first actuating plate, and fixed to be non-rotatable relative to the gear case and axially moveable relative to the gear case. A locked member is fixed for rotation with the first output gear. The locking member and the locked member cooperate to define means for locking the members to be non-rotatable relative to each other when the actuating plates rotate to the actuated condition, whereby the first output gear is locked to the gear case.

DETAILED DESCRIPTION OF THE PREFERRED EMBODIMENT

Figure 1:
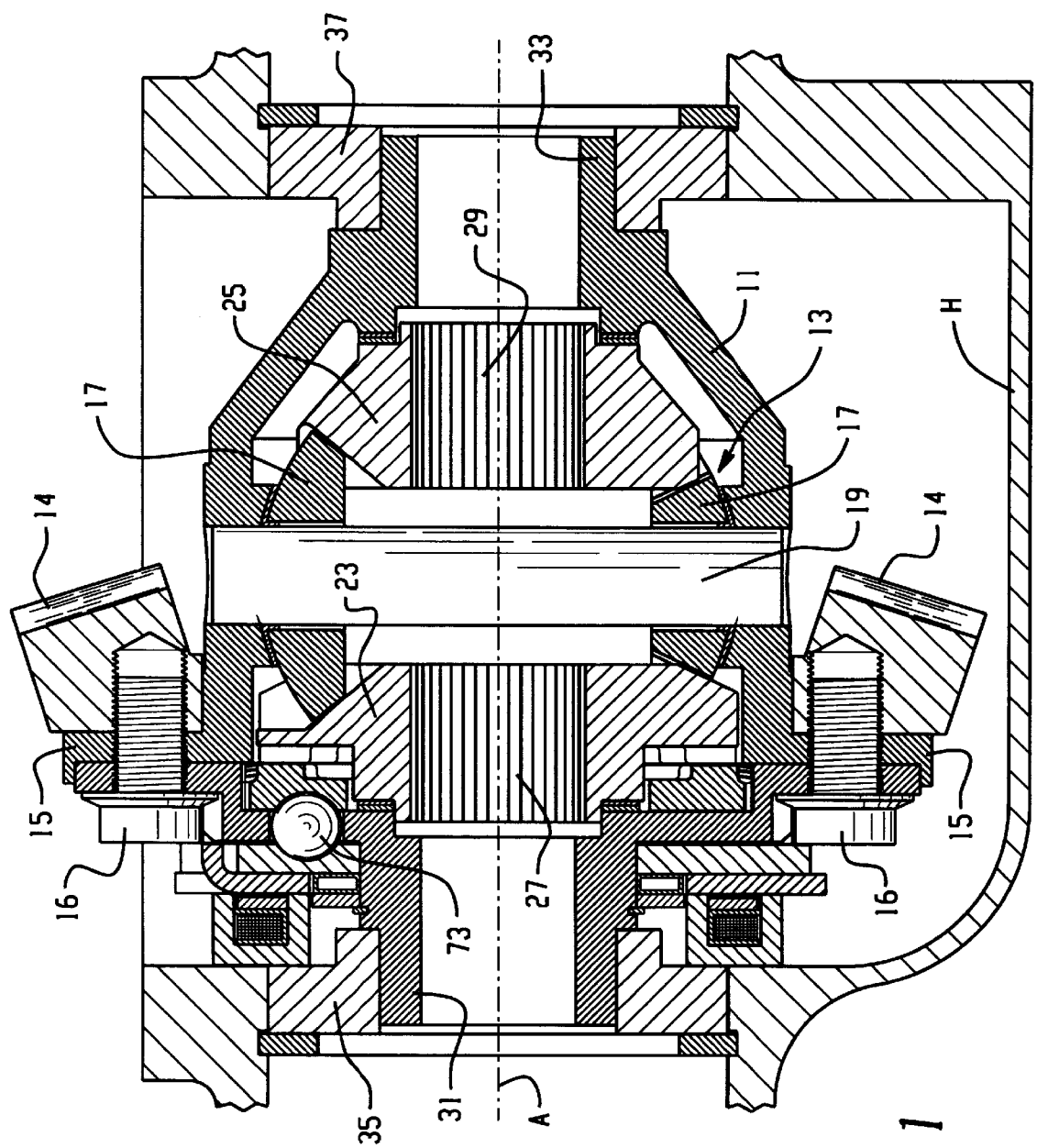
FIG. 1 is an axial cross-section of a locking differential made in accordance with the teachings of the present invention, in an unactuated, unlocked condition.

Referring now to the drawings, which are not intended to limit the invention, FIG. 1 is an axial cross-section of a locking differential including the present invention. The construction and operation of differentials of the general type illustrated in FIG. 1 may be better understood by reference to the above-incorporated patents.

The differential gear mechanism (locking differential) shown in FIG. 1 includes a gear case 11 which defines therein a gear chamber, generally designated 13. Torque input to the differential is typically by means of an input ring gear 14, which may be attached to a flange 15 of the gear case 11 by any suitable means, such as a plurality of bolts 16.

Disposed within the gear chamber 13 is a differential gear set including a pair of input pinion gears 17 which are rotatably mounted on a pinion shaft 19. Typically, the pinion shaft 19 is secured relative to the gear case 11 by some suitable means, such as a locking pin (not shown herein). The pinion gears 17 comprise the input gears of the differential gear set, and are in meshing engagement with a pair of side gears 23 and 25. The side gears 23 and 25 define sets of internal, straight splines 27 and 29, respectively, which are adapted to be in splined engagement with mating external splines of a pair of axle shafts (not shown). The gear case 11 includes annular hub portions 31 and 33 on which may be mounted a pair of bearing sets 35 and 37, respectively, which are used to provide rotational support for the differential mechanism relative to an outer differential housing H. It should be noted that, although the gear case 11 shown in FIG. 1 is of a conventional two-piece construction, such is not an essential feature of the invention.

As is well known to those skilled in the art, during normal, straight ahead operation of the vehicle, no differentiation occurs between the left and right side gears 23 and 25, and therefore, the pinion gears 17 do not rotate relative to the pinion shaft 19. The gear case 11, the pinion gear 17, and the side gears 23 and 25 all rotate about an axis of rotation A as a solid unit.

It should be understood that the locking differential of the present invention may be operated in either of several modes. The differential may be operated manually, i.e., wherein the driver manually selects the locked mode, such that the differential operates in the locked mode almost immediately after the vehicle begins to move. Alternately, the locking differential may operate in an automatic mode wherein, by way of example only, the vehicle microprocessor senses an operating condition, such as wheel slip, and transmits an appropriate electrical input signal to the locking differential, locking the side gear 23 relative to the gear case 11 and prevent any further differentiation.

In the case of automatic actuation of the locking differential, it will be understood that, under certain operating conditions, such as when the vehicle is turning, or a slight difference in tire size exists, it is permissible for a certain amount of differentiating action to occur between the side gears 23 and 25. However, in accordance with one important aspect of the invention, the locking differential of FIG. 1 does not include any clutch pack or any other mechanism which merely retards or limits differentiating action, but instead, operates in either an unactuated "open differential" mode, or in an actuated, locked mode.

Figure 2:
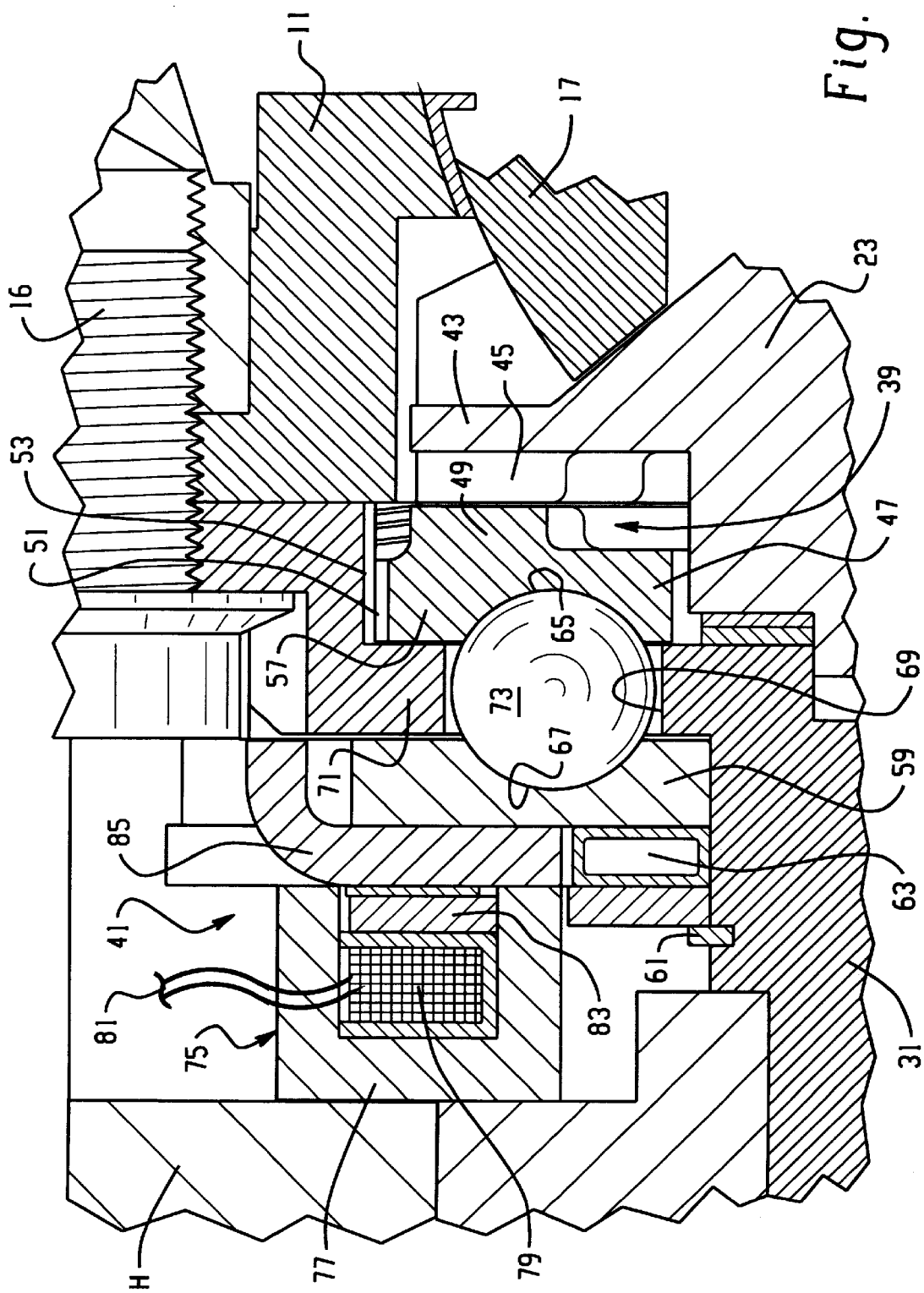
FIG. 2 is an enlarged, fragmentary, axial cross-section similar to FIG. 1, illustrating the present invention, still in its unactuated and unlocked condition.

Referring now primarily to FIG. 2, the locking differential of the present invention includes a rotation limiting mechanism, generally designated 39 (see also FIG. 5), which is disposed mostly within the gear case 11. The locking differential also includes an actuation mechanism, generally designated 41, a portion of which is disposed within the gear case 11, and a portion of which is disposed external thereto.

Figure 5:
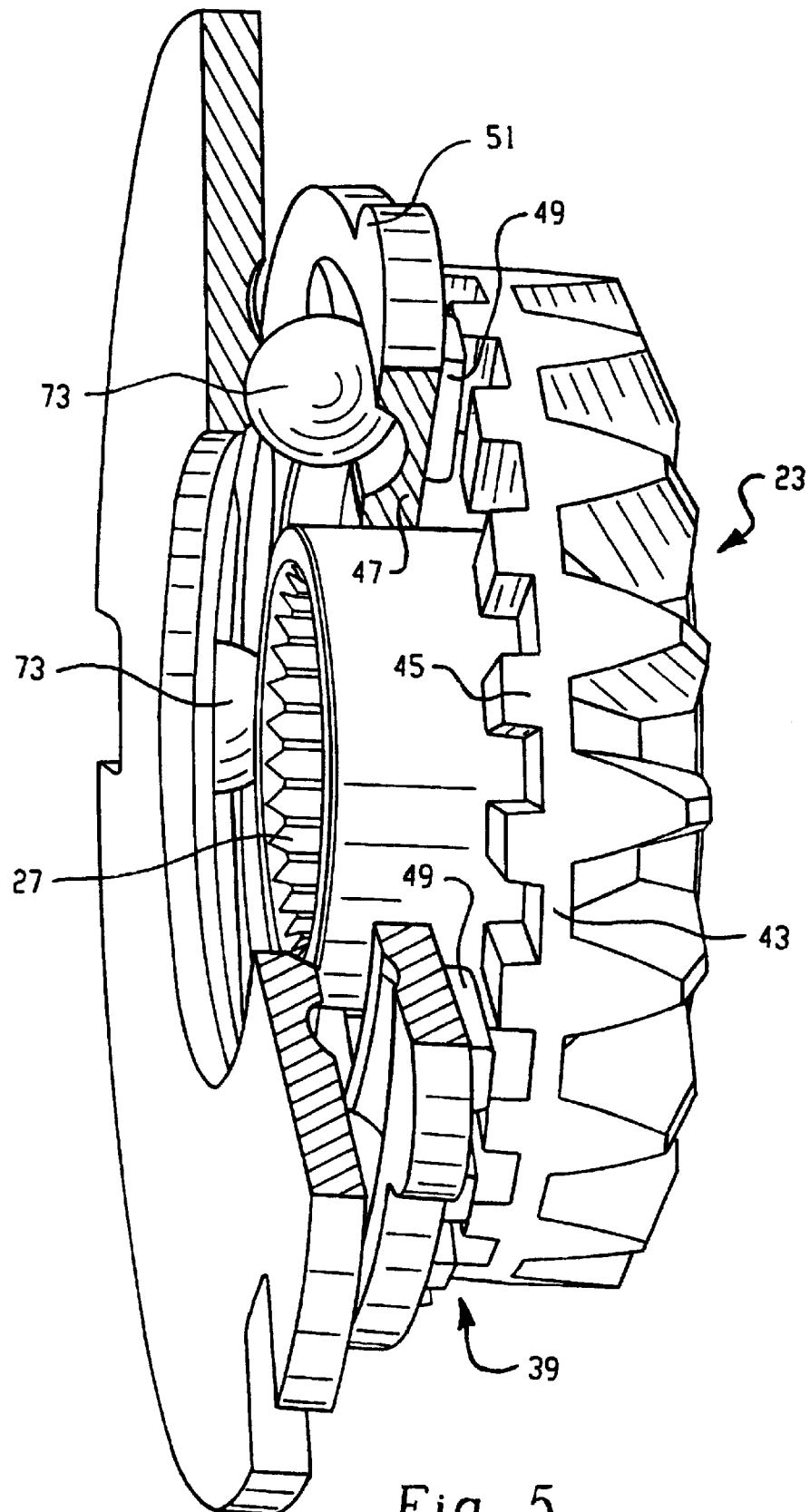
FIG. 5 is a fragmentary, perspective view, partly broken away, and with the gear case removed, illustrating the present invention.

Referring still to FIG. 2, the rotation limiting mechanism 39 comprises the side gear 23 including an annular flange portion 43, comprising a "locked member", extending radially outward almost to the inside diameter of the gear case 11. Preferably, the locked member 43 is formed integrally with the side gear, to reduce the number of parts and the manufacturing cost, although all that is essential is that the locked member 43 be fixed to rotate with the side gear 23. On the "outside" surface of the flange portion 43, i.e., on the left side in FIG. 2, there is an annular array of gear teeth 45. It should be understood that, although gear teeth are preferred, the particular configuration or type of gear teeth are not essential features of the invention, and in fact, a means other than gear teeth could be used within the scope of the invention. Disposed immediately adjacent the gear teeth 45, and in face-to-face relationship therewith, is an annular locking member 47 including an annular array of gear teeth 49, shown in FIG. 2 as being out of toothed engagement with the gear teeth 45. Although not essential to the invention, it is preferred that the arrays of gear teeth 45 and 49 each define pitch planes which are oriented generally perpendicular to the axis of rotation A, for reasons which will become apparent subsequently. However, it should be noted that the flanks of the gear teeth 45 and 49 may advantageously be disposed at a slight angle (as is shown in FIG. 5), on the order of several degrees, such that disengagement of the teeth can occur readily, without the need for a torque reversal.

The locking member 47 defines a set of external splines 51, in splined engagement with a set of internal splines 53 defined about an inside diameter of the left-hand portion of the gear case 11. Thus, the locking member 47 is fixed to be non-rotatable relative to the gear case 11, but is able to move axially from the position shown in FIG. 2 toward a position in which the gear teeth 45 and 49 are in toothed engagement. This position, with the gear teeth 45 and 49 engaged, is considered the engaged condition of the rotation limiting mechanism 39. Disposed between the locking member 47 and an adjacent surface of the gear case 11 is a set of wave springs, tending to bias the member 47 toward the disengaged position shown in FIG. 2.

Figure 3:
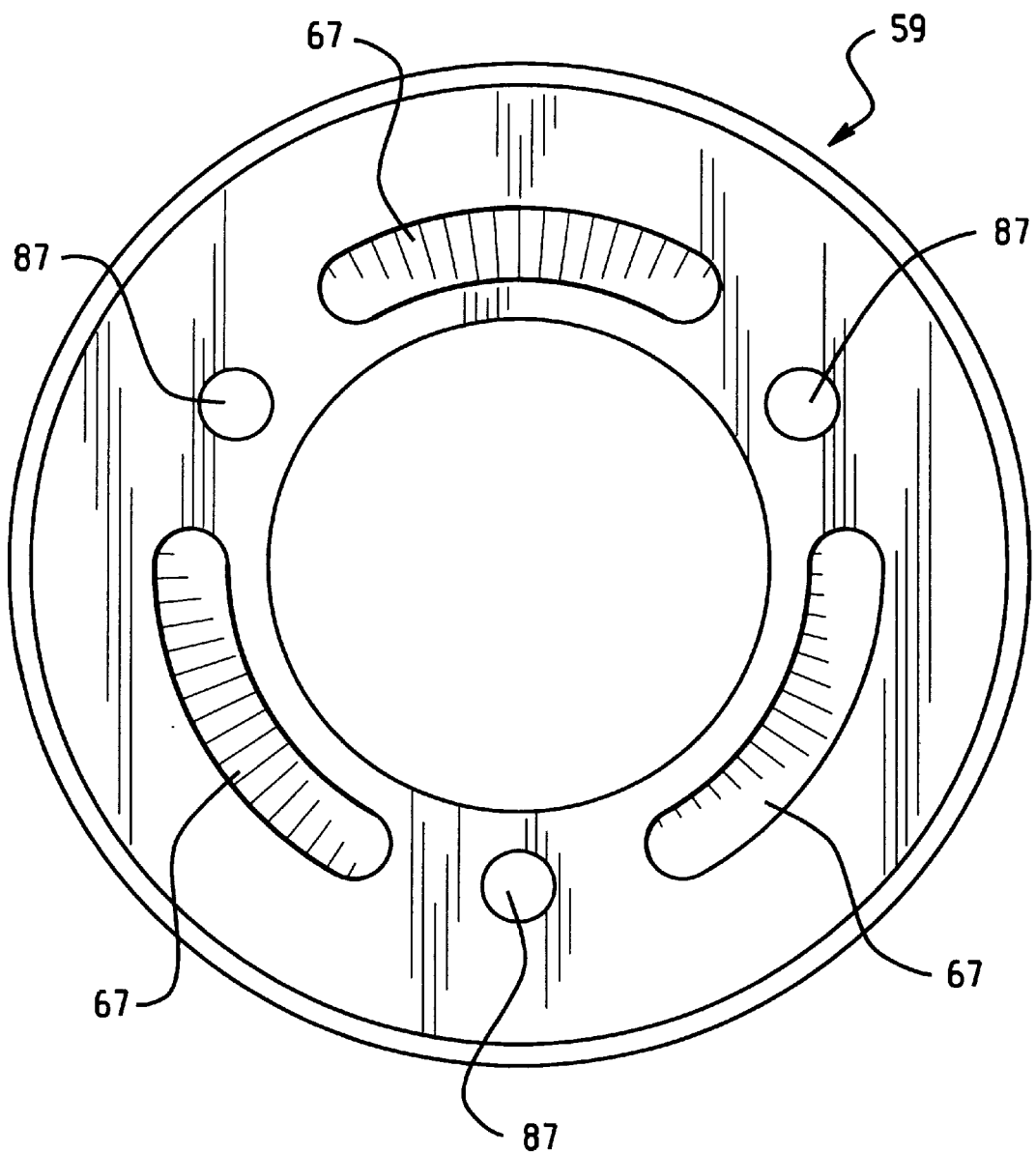
FIG. 3 is a plan view, from the right in FIG. 1, of the outer actuating plate, illustrating one aspect of the invention.
Figure 4:
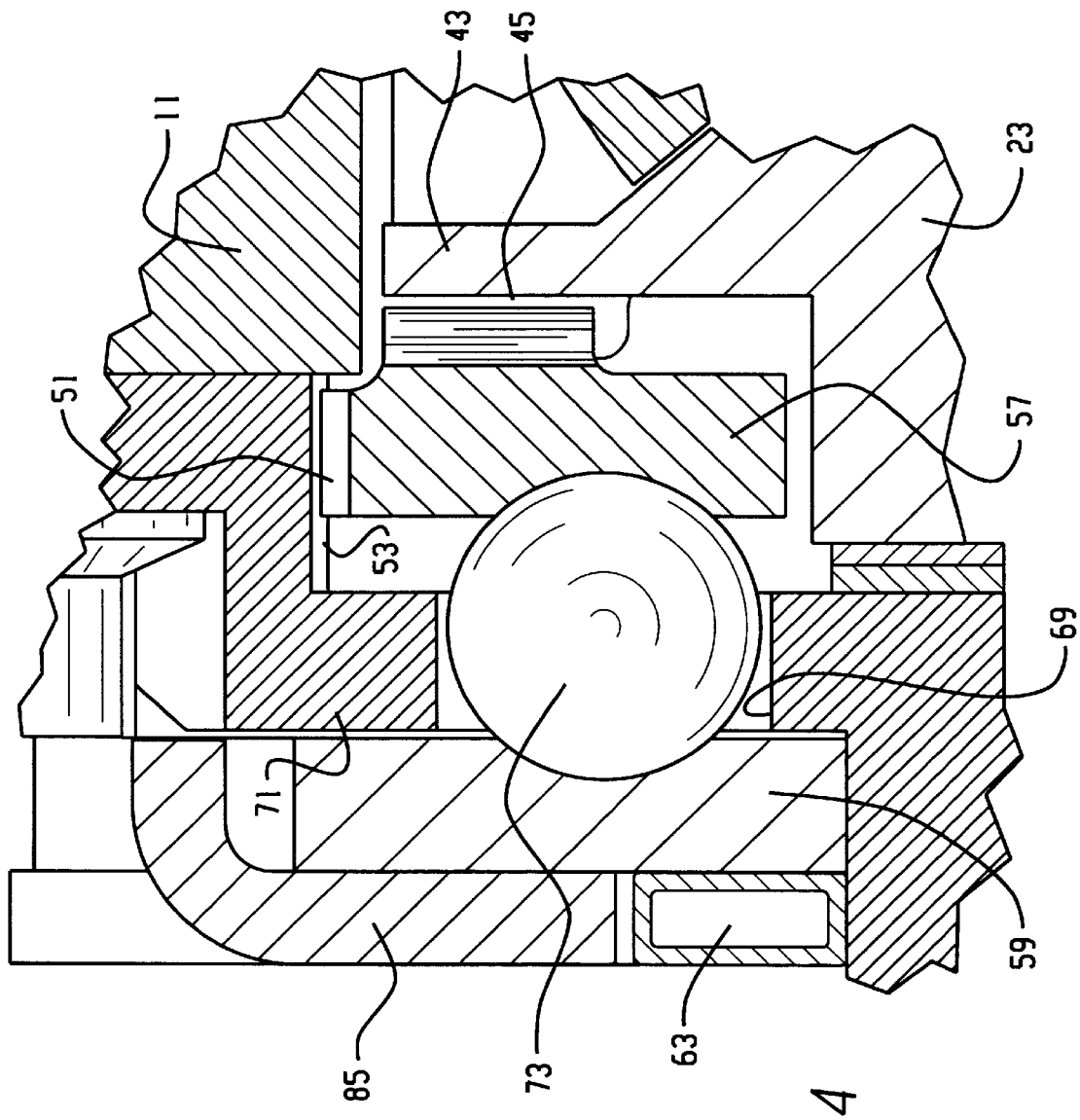
FIG. 4 is a further enlarged, fragmentary, axial cross-section similar to FIGS. 1 and 2, but illustrating the present invention in its actuated and locked condition.

Referring still primarily to FIG. 2, the actuation mechanism 41 comprises two subassemblies, a ball-ramp actuator, and an electromagnetic actuator, to be described now. The ball-ramp actuator includes an annular, inner actuating plate 57, which in accordance with one aspect of the invention, is preferably formed integrally with the annular locking member 47, as a single member, but serving several functions. The ball-ramp actuator also includes an annular, outer actuating plate 59 (see also FIG. 3). The outer actuating plate 59 is restrained axially, relative to the gear case 11, by means of a snap ring 61 and a thrust bearing 63.

The inner actuating plate 57 defines a plurality of ramp surfaces 65, and the outer actuating plate 59 defines a plurality of ramp surfaces 67. In the subject embodiment, there are three of the ramp surfaces 65 and three of the ramp surfaces 67, and in the neutral, disengaged position shown in FIG. 2, each of the ramp surfaces 65 is substantially circumferentially aligned with one of the ramp surfaces 67. Furthermore, the deepest portion of each of the ramp surfaces 65 and 67 is circumferentially aligned with a generally cylindrical opening 69 formed in an end wall 71 of the gear case 11. Disposed in each of the openings 69, and in engagement with each adjacent ramp surface 65 and 67, is a cam ball 73. It should be understood that the invention is not limited specifically to cam balls, but instead, various other types of cam-ramp arrangements could be used. Preferably, the openings 69 are actually somewhat oversized relative to the cam balls 73, in accordance with the teachings of above-incorporated U.S. Pat. No. 5,019,021. Thus, the plates 57 and 59, the ramp surfaces 65 and 67, and the openings 69 and cam balls 73 together comprise the ball-ramp actuator, the function of which is to transmit relatively low torque retarding rotation applied to the outer plate 59 into an axial force, to move the locking member 47 toward engagement.

The actuation mechanism 41 preferably comprises an electromagnetic coil assembly, generally designated 75, the function of which is to exert the required retarding torque on the outer actuating plate 59, thus initiating ramp-up of the ball-ramp actuator, as described previously. The coil assembly 75 is generally annular, and is concentric about the axis of rotation A, and is mounted stationary relative to the housing H. The coil assembly 75 includes an annular coil housing 77, and disposed therein is an electromagnetic coil 79, which may be a fairly conventional coil, adapted to receive an input electrical signal by means of a pair of electrical leads 81. Although the coil 75 is illustrated herein as annular, and provides a very compact, effective package, such is not an essential feature of the invention. Preferably, the coil assembly 75 is made in accordance with the teachings of U.S. Pat. No. 5,911,643, issued Jun. 15, 1999, in the names of David P. Godlew and David M. Preston, for a "DIFFERENTIAL GEAR MECHANISM AND IMPROVED BALL RAMP ACTUATION THEREOF", assigned to the assignee of the present invention, and incorporated herein by reference.

Associated with the coil 79, and disposed to the right thereof in FIG. 2, is a stainless steel spacer 83, preferably provided with a layer of a suitable friction material, such as a pyrolytic carbon friction material made in accordance with the teachings of U.S. Pat. No. 4,700,823, assigned to the assignee of the present invention, and incorporated herein by reference. The spacer 83 needs to comprise a non-magnetic material, so that the flux path surrounding the coil 79 does not pass through the spacer 83, but instead, passes through an annular drive plate 85. Therefore, when the coil 79 is energized, the flux path passes through the drive plate 85 and draws the plate 85 into frictional engagement with the friction material on the spacer 83. As may best be seen in FIG. 3, and as is illustrated and described in great detail in above-incorporated U.S. Pat. No. 5,911,643, the drive plate 85 and the outer actuating plate 59 are interconnected by means of a plurality of drive pins 87. The drive pins 87 are disposed in aligned circular openings defined by the plates 85 and 59, with the fit between the pins 87 and one set of the openings preferably comprising a press fit, such that there is no substantial circumferential movement between the plates 85 and 59.

Operation

When there is no input signal on the leads 81, and the coil 79 is de-energized, the drive plate 85 is disengaged from the coil assembly 75, and the entire ball-ramp actuator remains in its centered or neutral position, shown in FIG. 2, such that the teeth 45 and 49 remain in the disengaged condition shown. In this disengaged condition, the differential operates in the manner of an open differential, and the axle shafts are free to rotate independently of each other.

As was mentioned in the BACKGROUND OF THE DISCLOSURE, the present invention can operate in either a manual or an automatic mode. Assuming first the manual mode, the driver would select the "locked" mode while the vehicle was still stationary, but with no movement of the vehicle, there would be no lock-up occurring. The coil 79 would now be energized, however, drawing the drive plate 85 into engagement as described previously. When the vehicle begins to move, there may not initially be any differentiating action between the side gear 23 and the gear case 11, and therefore, the entire differential assembly would normally continue to rotate as a unit. However, in accordance with one important aspect of the invention, as soon as the differential begins to rotate relative to the housing H, the ball-ramp actuator begins to ramp-up, and before any substantial amount of slip speed builds up, the locking member 47 is moved axially into its engaged position, with the teeth 45 and 49 in toothed engagement. With the member 47 being splined to the case 11, and the locked member 43 integral with the side gear 23, the result of the toothed engagement is that the side gear 23 is locked to be non-rotatable relative to the gear case 11, and thereafter, the differential operates in a locked mode, with the entire differential rotating as a unit.

When the present invention is operating in an automatic mode, the differential operates in the disengaged condition of FIG. 2 until an impending spin-out is sensed, or some other vehicle parameter is sensed. The vehicle microprocessor then sends an appropriate signal to the leads 81, energizing the coil 79. As soon as this energization occurs, ramp-up of the ball-ramp actuator will occur in the manner described previously, and the gear teeth 45 and 49 will be engaged, also in the manner described previously. The only difference in the automatic mode is that there may already be some relative rotation of the locking member 47 and locked member 43 when the actuation is initiated. However, to avoid damage to the gear teeth 45 and 49, it is desirable for engagement to occur as soon as a certain, predetermined operating condition is sensed. One of the advantages of the present invention is the ability of the mechanism to react quickly, especially when operating in the automatic mode. Thus, the mechanism of the invention is designed to be able to achieve the engaged condition within 200 milliseconds after an "engage" command, and then to be able to achieve the disengaged condition within 150 milliseconds after a "disengage" command.

In addition to protecting the gear teeth, the fast response time of the invention allows the mechanism to go to the disengaged condition in response to a brake signal from the vehicle microprocessor, such that the differential mechanism will not interfere with the operation of the vehicle ABS (anti-lock brake system). Disengaging the differential mechanism allows each of the wheels driven by the differential to be braked independently.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism of the type including a gear case defining an axis of rotation and a gear chamber; differential gear means disposed in said gear chamber including at least one input gear and first and second output gears; means operable to limit rotation of said first output gear relative to said gear case for common rotation therewith; actuating means for said rotation limiting means, said actuating means including first and second actuating plates comprising a cam and ramp type actuator, wherein relative rotation of said first and second actuating plates from an unactuated condition to an actuated condition is effective to move said rotation limiting means toward an engaged condition; said second actuating plate being disposed, in said unactuated condition, to rotate with said gear case; an electromagnetic actuator disposed adjacent said second actuating plate, and including friction means, operable in response to an electrical input signal to move to an actuated position in frictional engagement with said second actuating plate, effective to cause relative rotation of said actuating plates to said actuated condition; characterized by:

(a) said rotation limiting means comprising a locking member disposed adjacent said first actuating plate, and fixed to be non-rotatable relative to said gear case and axially moveable relative to said gear case;

(b) a locked member fixed for rotation with said first output gear; and (c) said locking member and said locked member cooperating to define means for locking said members to be non-rotatable relative to each other when said actuating plates rotate to said actuated condition, whereby said first output gear is locked to said gear case.

2. A differential gear mechanism as claimed in claim 1, characterized by said first actuating plate being disposed within said gear case, and said second actuating plate being disposed external to said gear case.

3. A differential gear mechanism as claimed in claim 2, characterized by said gear case including means operable to prevent substantial axial movement of said second actuating plate, relative to said gear case, while permitting rotational movement of said second actuating plate, relative to said gear case.

4. A differential gear mechanism as claimed in claim 2, characterized by said gear case including an end wall defining a plurality of cut-out portions, each of said cut-out portions being circumferentially aligned with a first and a second ramp surface defined by said first and second actuating plates, respectively, when said actuating plates are in said unactuated condition.

5. A differential gear mechanism as claimed in claim 4, characterized by said actuating means further comprising a cam ball in engagement with each pair of said first and said second ramp surface, each of said cam balls being disposed in one of said cut-out portions defined by said end wall of said gear case.

6. A differential gear mechanism as claimed in claim 1, characterized by said locking member being formed integrally with said first actuating plate, said gear case defining a set of internal splines, and said first actuating plate defining a set of external splines in engagement with said internal splines.

7. A differential gear mechanism as claimed in claim 6, characterized by said locked member being formed integrally with said first output gear, and said locking member and said locked member being generally annular members disposed in face-to-face relationship with each other.

8. A differential gear mechanism as claimed in claim 7, characterized by said means for locking comprising said locking member and said locked member defining first and second annular arrays of teeth, disposed to be out of engagement when said actuating plates are in said unactuated condition, and disposed to be in toothed engagement when said actuating plates are in said actuated condition.

9. A differential gear mechanism as claimed in claim 8, characterized by said first and second annular arrays of teeth defining pitch planes which are oriented generally perpendicular to said axis of rotation.

10. A differential gear mechanism as claimed in claim 1, characterized by said electromagnetic actuator comprising a stationary, generally annular, electromagnetic coil, disposed in a generally face-to-face relationship with said second actuating plate, and defining therebetween an axial space.

11. A differential gear mechanism as claimed in claim 10, characterized by an annular drive plate disposed in said axial space between said second actuating plate and said electromagnetic coil, and means operable to interconnect said second actuating plate and said annular drive plate, whereby said plates are fixed to rotate in unison, but said drive plate is free to move axially within said axial space relative to said second actuating plate, and engage a friction surface of said electromagnetic coil.

* * * * *